United States Patent
Chen et al.

(10) Patent No.: US 10,405,237 B2
(45) Date of Patent: *Sep. 3, 2019

(54) AIR-TIME FAIR TRANSMISSION REGULATION WITHOUT EXPLICIT TRAFFIC SPECIFICATIONS FOR WIRELESS NETWORKS

(71) Applicant: KONINKLIJKE PHILIPS N.V., Eindhoven (NL)

(72) Inventors: Yingwei Chen, Briarcliff Manor, NY (US); Richard Chen, Croton-on-Hudson, NY (US); Ruediger Schmitt, Baden-Württemberg (DE); Sai Shankar Nandagopalan, San Diego, CA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 116 days.

This patent is subject to a terminal disclaimer.

(21) Appl. No.: 14/824,119

(22) Filed: Aug. 12, 2015

(65) Prior Publication Data

US 2015/0350113 A1    Dec. 3, 2015

Related U.S. Application Data

(63) Continuation of application No. 11/719,774, filed as application No. PCT/IB2005/053791 on Nov. 16, 2005, now Pat. No. 9,215,621.

(60) Provisional application No. 60/630,089, filed on Nov. 22, 2004.

(51) Int. Cl.
*H04W 28/14* (2009.01)
*H04L 12/801* (2013.01)
*H04L 12/807* (2013.01)
*H04L 12/851* (2013.01)
*H04L 12/861* (2013.01)
*H04L 12/863* (2013.01)

(52) U.S. Cl.
CPC .............. *H04W 28/14* (2013.01); *H04L 47/24* (2013.01); *H04L 47/27* (2013.01); *H04L 47/29* (2013.01); *H04L 47/50* (2013.01); *H04L 49/90* (2013.01)

(58) Field of Classification Search
CPC ..... H04L 12/5693; H04L 29/06; H04L 47/20; H04L 47/2408; H04L 47/10; H04L 47/12; H04L 47/56; H04L 47/2441; H04W 88/185
See application file for complete search history.

(56) References Cited

U.S. PATENT DOCUMENTS

| 5,726,640 | A | * | 3/1998 | Jones | ................. H04W 88/185 340/7.28 |
| 5,742,590 | A | | 4/1998 | Lin | |
| 5,881,245 | A | | 3/1999 | Thompson | |

(Continued)

FOREIGN PATENT DOCUMENTS

| EP | 0872979 A2 | 10/1998 |
| EP | 1227626 A2 | 7/2002 |

(Continued)

*Primary Examiner* — Melanie Jagannathan

(57) ABSTRACT

A system and method are provided for non-transmission specification fair air-time, NT-AirFair, allocation control by tracking the transmission time consumed by each link to detect any increase and enforcing air-time allocation based on the pattern of usage derived therefrom.

4 Claims, 3 Drawing Sheets

(56) References Cited

U.S. PATENT DOCUMENTS

| | | |
|---|---|---|
| 6,473,399 B1 | 10/2002 | Johansson |
| 6,725,270 B1 | 4/2004 | Yu |
| 6,822,969 B2 | 11/2004 | Love |
| 6,888,842 B1 * | 5/2005 | Kirkby ................ H04L 41/0896 370/414 |
| 6,990,113 B1 * | 1/2006 | Wang .................. H04L 12/5693 370/401 |
| 7,088,702 B2 | 8/2006 | Shvoduan |
| 7,136,392 B2 | 11/2006 | Wentink |
| 2004/0001491 A1 * | 1/2004 | Ruutu ................ H04L 12/5693 370/395.4 |
| 2004/0125779 A1 | 7/2004 | Kelton |
| 2004/0153564 A1 * | 8/2004 | Lakkakorpi ......... H04L 12/5693 709/232 |
| 2004/0170186 A1 | 9/2004 | Shao |
| 2004/0177087 A1 * | 9/2004 | Wu .................... H04L 12/5693 |

FOREIGN PATENT DOCUMENTS

| | | |
|---|---|---|
| JP | 2004200905 A | 7/2004 |
| JP | 2004248074 A | 9/2004 |

* cited by examiner

AIR-TIME FAIR TRANSMISSION REGULATION WITHOUT EXPLICIT TRAFFIC SPECIFICATIONS FOR WIRELESS NETWORKS

The present invention relates to transmission control in a wireless multimedia communication system.

In wireless networks, multiple nodes share access to the communication medium. Various Media Access Control (MAC) mechanisms have been designed to enable sharing the medium efficiently. Airtime fair (or AirFair) transmission control has been layered on top of MAC protocols as an additional mechanism that ensures each traffic flow of its allocated air time, on an as-needed basis, regardless of the conditions of other links. This approach prevents the unfair allocation of transmission time that otherwise would accrue to stations with good links. In other words, with current AirFair control technology if a link is experiencing much longer transmission time for each packet due to link degradation, the link can exceed its allocated transmission time only if there is surplus airtime unused by other stations. This is important for high-quality video transmission over wireless networks, because this type of video traffic is high data rate, delay intolerant and sensitive to data losses.

One limitation of existing AirFair technology is that it requires the application layer to specify and pass to the admission control and scheduling modules information about each traffic flow, such as bit rate and delay tolerance. In practice, such information is not always available, and the interface for passing such information remains to be standardized and implemented.

The system and method of the present invention provide a non-TSPEC (traffic specification) fair air-time allocation control mechanism that overcomes the limitations of existing AirFair technologies. The system and method of the present invention perform tracking the transmission time consumed by each link, detection of any increase in such transmission time, and enforcement of airtime allocation based on the pattern of usage derived therefrom.

Further, the system and method of the present invention enforces airtime allocation without requiring any traffic specification (TSPEC) to be made available, thereby enhancing the quality of service feature for a wide range of wireless devices and applications.

In the following description, by way of explanation and not limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details.

An important component of the many QoS network architectures proposed is the packet scheduling algorithm employed by network components to determine the order of forwarding packets over a shared output link for various input flows. The packet scheduler determines the order in which packets of the various independent flows are forwarded on a shared output link. One of the simplest algorithms is First In First Out (FIFO) in which the order of arrival of packets also determines the order in which they are forwarded over the output link. While almost trivial to implement, FIFO clearly cannot enforce QoS guarantees because it allows rogue flows to capture an arbitrary fraction of the output bandwidth.

In general, a packet scheduler should have the following properties:

1. Fairness The packet scheduler should provide some measure of isolation between multiple flows competing for the same shared output link. In particular, each flow should get its fair share of the available bandwidth, and this share should not be affected by the presence and (mis)behavior of other flows. For example, this share may be a pre-allocated amount of bandwidth that should be available to the flow, regardless of other flow activity.

2. Bounded Delay Interactive applications such as video and audio conferencing require the total delay experienced by a packet in the network to be bounded on an end-to-end basis. The packet scheduler decides the order in which packets are sent on the output link, and therefore determines the queuing delay experienced by a packet at each intermediate step in the network and hence determines the total delay.

3. Low complexity The time spent choosing the next packet to schedule must be small and independent of the number of flows n. Equally important, the scheduling algorithm must be amenable to an efficient implementation in a wireless device whose resources are necessarily limited.

The system and method of the present invention possess all three characteristics, in varying degrees.

Figure 1:
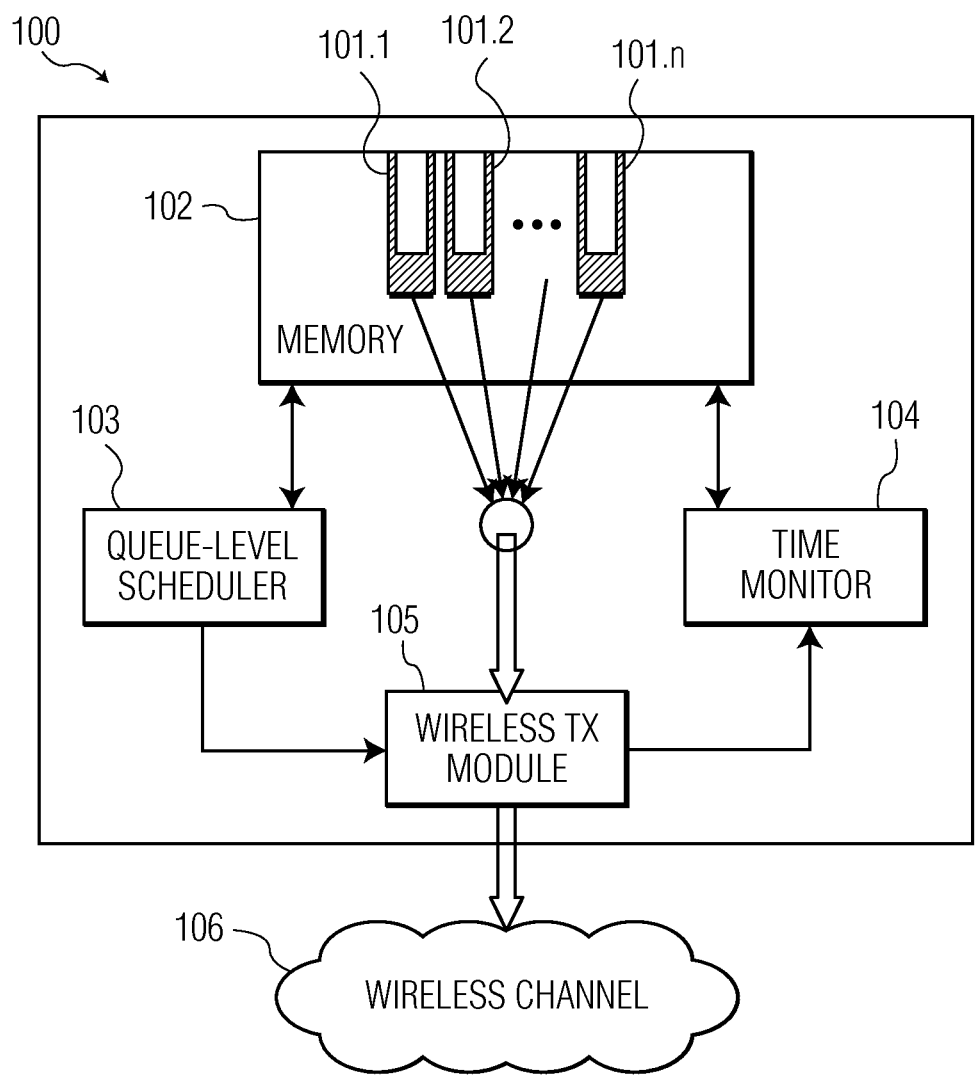
FIG. 1 illustrates a simplified block diagram of a wireless device modified according to an embodiment of the present invention.

A wireless device 100 modified according to the present invention may include a system with an architecture that is illustrated in the block diagram of FIG. 1. Each wireless device 100 may include a memory 102 comprising n queues 101.1-101.n that are assigned flows and weights by a time monitor 104. The time monitor 104 keeps track of the per-byte transmission time experienced by each queue and adjusts the queue's weight and retry limit as well as transmission opportunity (TXOP) accordingly. The device further comprises a queue-level scheduler 103 that uses the weights to schedule packets enqueued in the various queues for transmission by the wireless transmission module 105 over the wireless channel 106.

Figure 3:
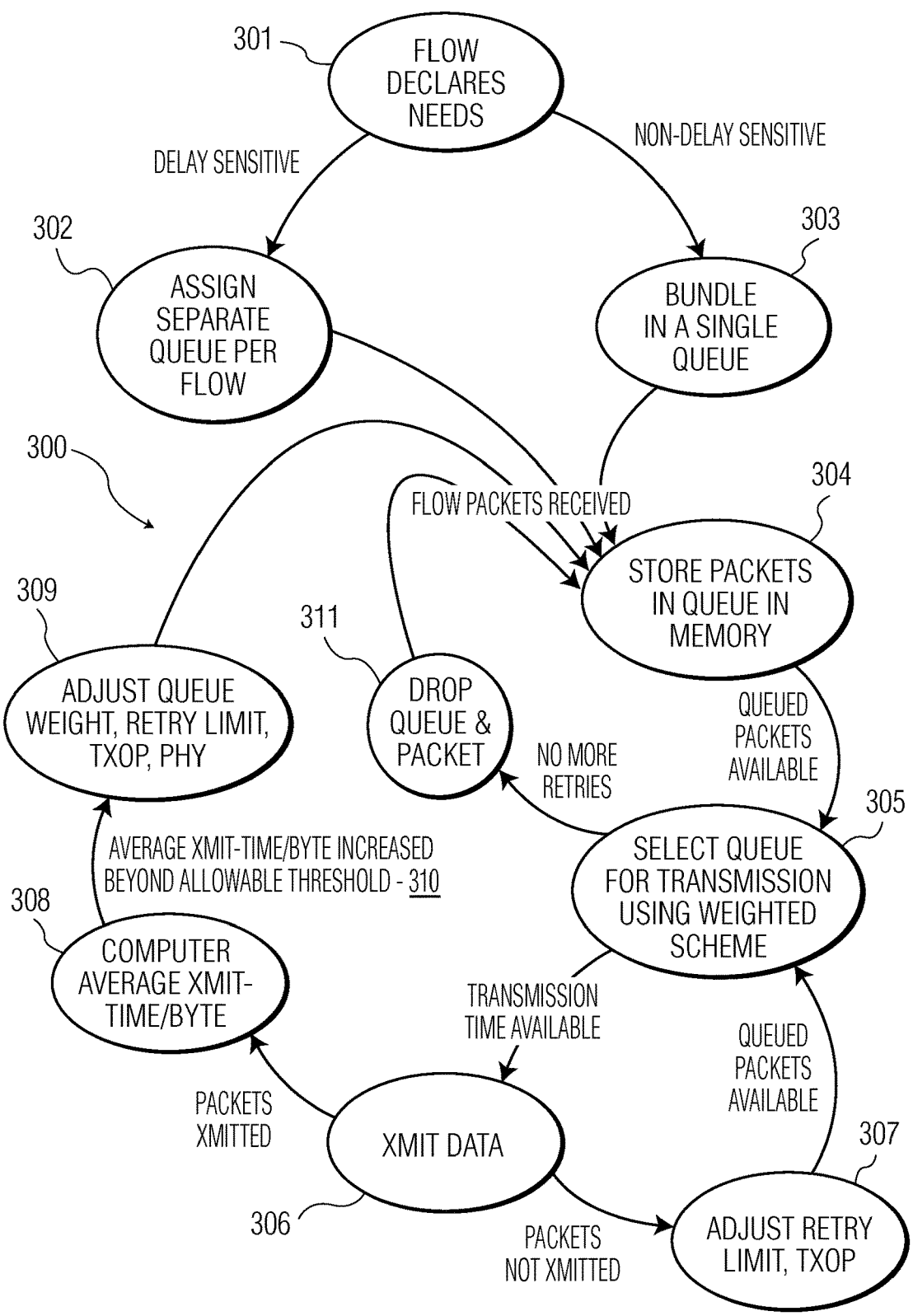
FIG. 3 illustrates an FSD diagram of the method of the present invention.

Referring now to FIG. 3, in a preferred embodiment, a flow declares its needs to a device 100 at state 301 and each delay-sensitive traffic flow (video, voice, audio) is assigned to a separate queue i 101.i stored in memory 102 of the device 100 which bounds the delay per flow, whereas all non-delay-sensitive traffic flows are optionally bundled into a single queue at state 303 without negatively affecting the performance (fairness characteristic) of the NT-AirFair (Non-TSPEC AirFair) allocation scheme of the system and method of the present invention. Each queue is assigned a weight $q_{i,old}=q_{i,new}$ at state 302. Thereafter, when packets of a flow are received they are enqueued at state 304 in the appropriate queue that was established when the flow was admitted and scheduled by a queue-level scheduler 103 in accordance with their pre-assigned weights. However, in the system and method of the present invention the weights are dynamically adjusted to reflect link conditions while retaining the fairness of the medium allocation.

The NT-Airfair modification to a wireless device 100 of the present invention works together with an existing queue-level scheduler 103 that performs weighted scheduling on a per flow basis, as illustrated in FIG. 1. The existing queue-level scheduler 103 can be located in an operating system kernel, a wireless device driver, or the MAC. The device is further configured with a time monitor module 104 that computes window-averaged transmit time per byte, tracks increases in this average time, adjusts each of the weights, retries limit and TXOP accordingly as well as performs all the other computations necessary for implementing the present invention. At state 305, when packets are available for transmission the next packet to be transmitted is determined by the queue-level scheduler using an existing weighted priority scheme. Typically, the queue-level scheduler employs a separate queue for each of n different traffic flows i and assigns different weights $q_i$, i=1, ..., n, to the queues for advanced queuing algorithms such as weighted round-robin and weighted fair queuing, both of which are based on priority queuing. However, in a preferred embodiment the weights are adjusted in accordance with the system and method of the present invention and are not static, as they are in many prior art priority queuing schemes.

In priority queuing, each arriving packet is placed into a queue based on its priority which may be, e.g., high, medium, norm, and low. Higher priority queues are preferred, i.e., packets in higher-priority queues are preferred for transmission and lower-priority queues gain access to the medium only when no higher-priority queues have packets waiting for transmission. Thus, higher priority queues get serviced at the expense of lower-priority queues and the latter experience delivery delays and even failure in such a scheme.

Weighted round robin makes sure that no queue dominates at the expense of others. Weighted round robin queuing transmits entire queues in round-robin order with a priority being assigned to a queue, i.e., by defining the queue's length. Thus, the longer the queue, the higher the queue's priority. Weighted round robin processes more high-priority traffic and treats low-priority traffic fairly.

A more comprehensive scheme that fairly handles both heavy and light traffic is weighted fair queuing (WFQ), which uses flow-based queuing to dynamically allocate a proportionate part of link bandwidth to each flow, i.e., proportionate to its priority level. That is, WFQ is a combination of (1) per-flow queuing and (2) weighted round-robin scheduling.

In a TSPEC-based air-fair scheme, the TSPECs for traffic flows are used to calculate the queue weights. A module in the device driver measures the consumed airtime for each traffic flow. The dequeuing module uses this information together with the weights to enforce airtime allocation by adjusting the queue weights.

In a preferred embodiment that does not use TSPECs, NT-AirFair of the present invention, it is assumed that each flow i has been assigned an initial weight $q_{i,old}=q_{i,new}$ and a window size t has been pre-determined. Then, after data is transmitted at state 306 the transmission time per byte of data (including retransmission time) is tracked at state 308 over consecutive windows of size t to produce a sequence $T_{i,j}$ for each traffic flow i over time t:

$T_{i,j}$=transmission_time_consumed/packet_size, for
j=1, 2, ..., and i=1, ..., n.

In another aspect, measuring the normalized transmission time excludes the airtime consumed by MAC and PHY (physical layer) overhead to reflect more accurately the underlying link condition:

$T_{i,j}$=(transmission_time_consumed−MAC_header_overhead_time)/packet_size, for j=1, 2 ...

This applies only with varying PHY wherein overhead_time is the major cause of long transmission time. Thus the time complexity of the NT AirFair of the present invention is low.

If the sequence $T_{i,j}$ increases, on a windowed-average basis, by more than a pre-determined threshold, the queuing weight $q_{i,new}$ for traffic flow i is adjusted at state 309 to lower its priority in dequeuing the corresponding enqueued packets of the flow i relative to all other traffic flows. A preferred embodiment adjusts the queue weight inversely proportionally to the airtime increase:

$q_{i,new}=q_{i,old}*(T_{i,old}/T_{i,new})$.

The window size t for the averaging must be large enough to effectively eliminate the impact of sporadic fluctuations in the link condition, while small enough to enable quick response to link degradation.

In priority-based MAC, it is most likely that delay-sensitive traffic flows per flow category are bundled into one queue in the device driver and the MAC. Because packets held up in a queue will block subsequent packets in the same queue, it is impractical, if not impossible, to differentiate among traffic flows heading to different stations in the dequeuing process. A non-dequeuing-based differentiating mechanism is therefore needed for priority-based MAC.

In all embodiments, a normalized transmission time per byte $T_{i,t,j}$ is measured and tracked. If the transmission time for a particular flow is detected to have increased beyond a certain pre-determined threshold at state 308, the retry limit for the packet and the flow is lowered or set to 0 to prevent the flow's packets from repeatedly trying to access the channel and thus blocking packets from other flows. Retry limits for non-offending flows are not changed. The previous "allowed" transmission time is also used to determine the minimum PHY rate under the new retry limit at state 309, to prevent the link adaptation module from setting the PHY rate too low, resulting in the flow continuing to consume too much airtime.

In all embodiments, when packet transmission fails, TXOP is adjusted at state 3077 and transmission is retried at state 305. When the retry limit is exceeded, i.e., the queued packet is dropped at state 311 so that when the retry limit is exhausted packets are prevented from piling up in queues.

In conjunction with resetting the retry limit at state 310, TXOP can also be set to the "allowed" airtime for each flow. Because a single queue can hold packets for different traffic flows, the TXOP needs to be estimated and reset on a per-packet basis.

In preferred embodiments, Non-TSPEC AirFair (or NT-AirFair) can be implemented in alternative parts of the protocol stack such as:
    in the queuing module of the operating system kernel;
    the wireless device driver; and
    the MAC.

Figure 2:
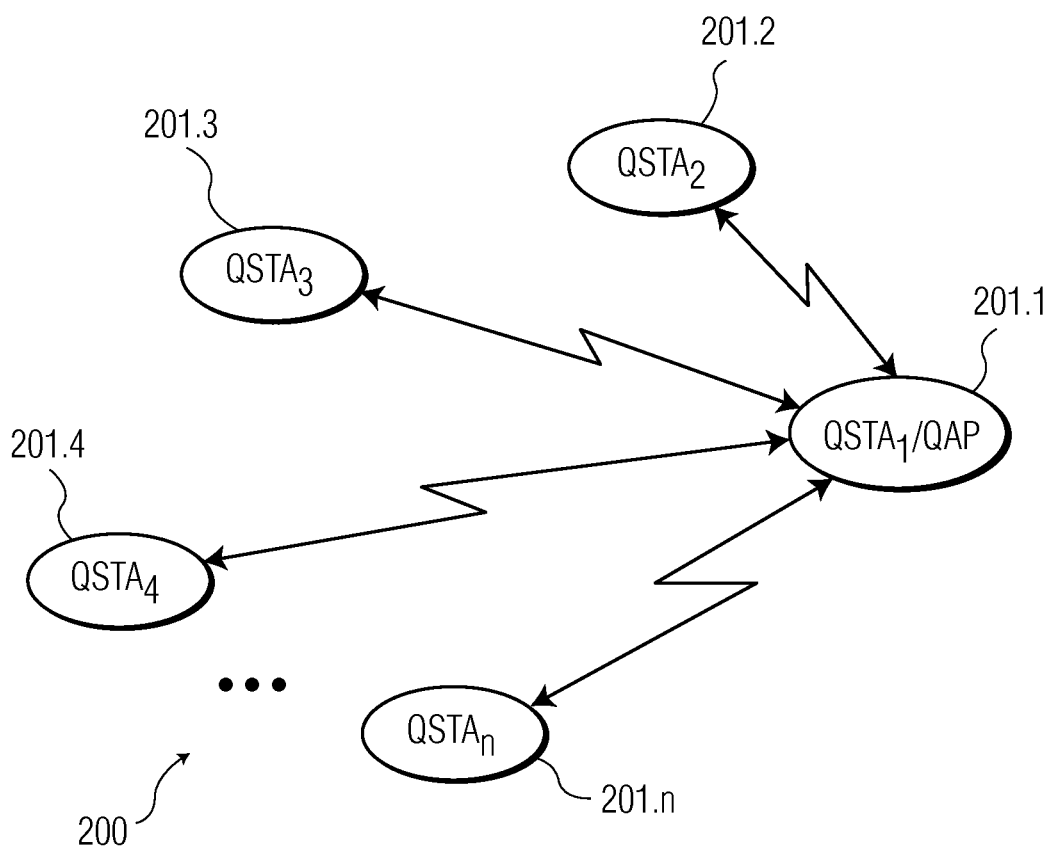
FIG. 2 illustrates a wireless communication network of devices each modified according to the present invention.

Referring now to FIG. 2, NT-AirFair, according to the present invention, can be performed by both access points (that coordinate stations) 201.1 and stations 201.2-201.n of a wireless network 200 in which each device or station 201.i is additionally configured with an apparatus (100) as illustrated in FIG. 1, in accordance with the present invention.

The invention can be applied to Wireless LAN (802.11) IC, wireless PAN IC; wireless video servers and receivers, wireless media adapters, media PCs, and wireless video transmission modules.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation, such as dynamically adjusting the window size based on the link condition, and the teaching of the present invention can be adapted in ways that are equivalent without departing from its central scope. Therefore it is intended that the present invention not be limited to the particular embodiment disclosed as the best mode contemplated for carrying out the present invention, but that the present invention include all embodiments falling within the scope of the appended claims.

What is claimed is:

1. An apparatus, comprising:
    a memory configured to comprise more than one weighted queue;
    a scheduler configured to receive a flow and distribute at least one packet of the received flow to at least one weighted queue of the more than one weighted queues, the scheduler configured to distribute the at least one packet of the received flow to the at least one weighted queue based on a delay sensitivity of the received flow; and
    a monitor configured to monitor at least per-byte transmission time of more than one transmitted packet of the received flow from at least one weighted queue;
    compute an average per-byte transmission time of the more than one transmitted packet; and
    adjust a predetermined weight of the at least one weighted queue or a per-byte retry limit when the average per-byte transmission time exceeds the threshold.

2. The apparatus of claim 1, wherein the scheduler is further configured to:
    determine a delay sensitivity of the received flow; and
    assign a weighted queue to each of the received delay sensitive flow.

3. The apparatus of claim 1, wherein the scheduler is further configured to:
    determine a delay sensitivity of the received flow; and
    bundle one or more non-delay sensitive flows into a weighted queue, wherein the received delay sensitive flows are each assigned a predetermined weighted queue and the received non-delay sensitive flows are bundled into another predetermined weighted queue.

4. The apparatus of claim 1, wherein the scheduler comprises a selected one of a queuing module, an operating system kernel, and a device driver.

* * * * *